July 17, 1956     F. M. GATES ET AL     2,754,838
DRINKING FOUNTAIN FOR POULTRY

Filed March 17, 1954     2 Sheets-Sheet 1

INVENTORS
FRANKLIN M. GATES
HERMAN J. R. HUSSMAN
BY
*S. Jay Teller*
ATTORNEY

July 17, 1956 F. M. GATES ET AL 2,754,838
DRINKING FOUNTAIN FOR POULTRY
Filed March 17, 1954 2 Sheets-Sheet 2

INVENTORS
FRANKLIN M. GATES
HERMAN J. R. HUSSMAN
BY
S. Jay Teller
ATTORNEY

United States Patent Office 2,754,838
Patented July 17, 1956

2,754,838

DRINKING FOUNTAIN FOR POULTRY

Franklin M. Gates, West Hartford, and Herman J. R. Hussman, Plainville, Conn., assignors to The Smith-Gates Corporation, Plainville, Conn., a corporation of Connecticut Application March 17, 1954, Serial No. 416,754

5 Claims. (Cl. 137—404)

The invention relates to a drinking fountain primarily intended for poultry. The general object of the invention is to provide a drinking fountain wherein the flow of water is automatically and reliably controlled to always maintain a suitable amount of water, wherein the parts are simple and inexpensive, and wherein the parts are readily separable for convenient cleaning.

The drawings show a presently preferred embodiment of the invention, but it will be understood that various changes may be made from the construction shown and that the drawings are not to be construed as defining or limiting the scope of the invention, the claims forming a part of this specification being relied upon for that purpose.

Figure 1:
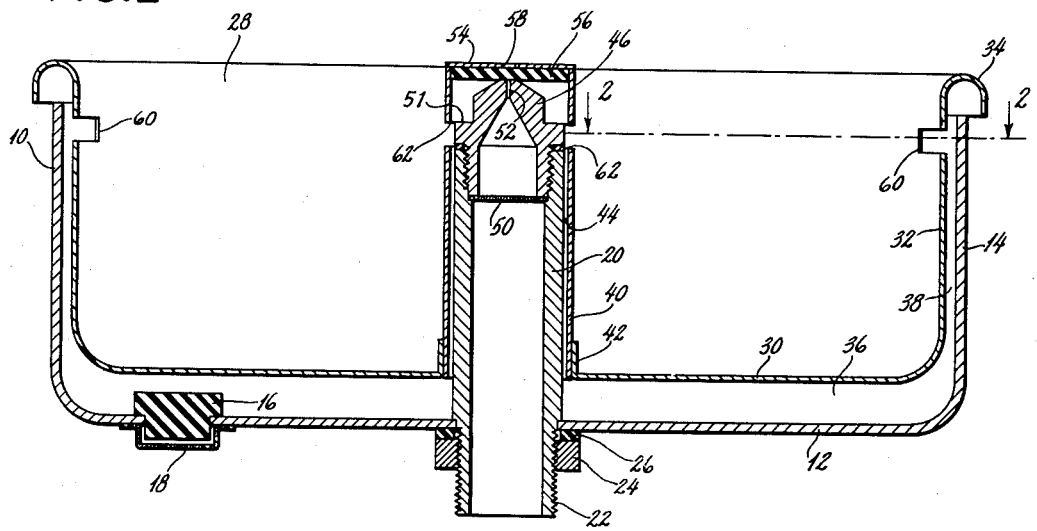
Fig. 1 is a central vertical sectional view of a drinking fountain embodying the invention.
Figure 2:
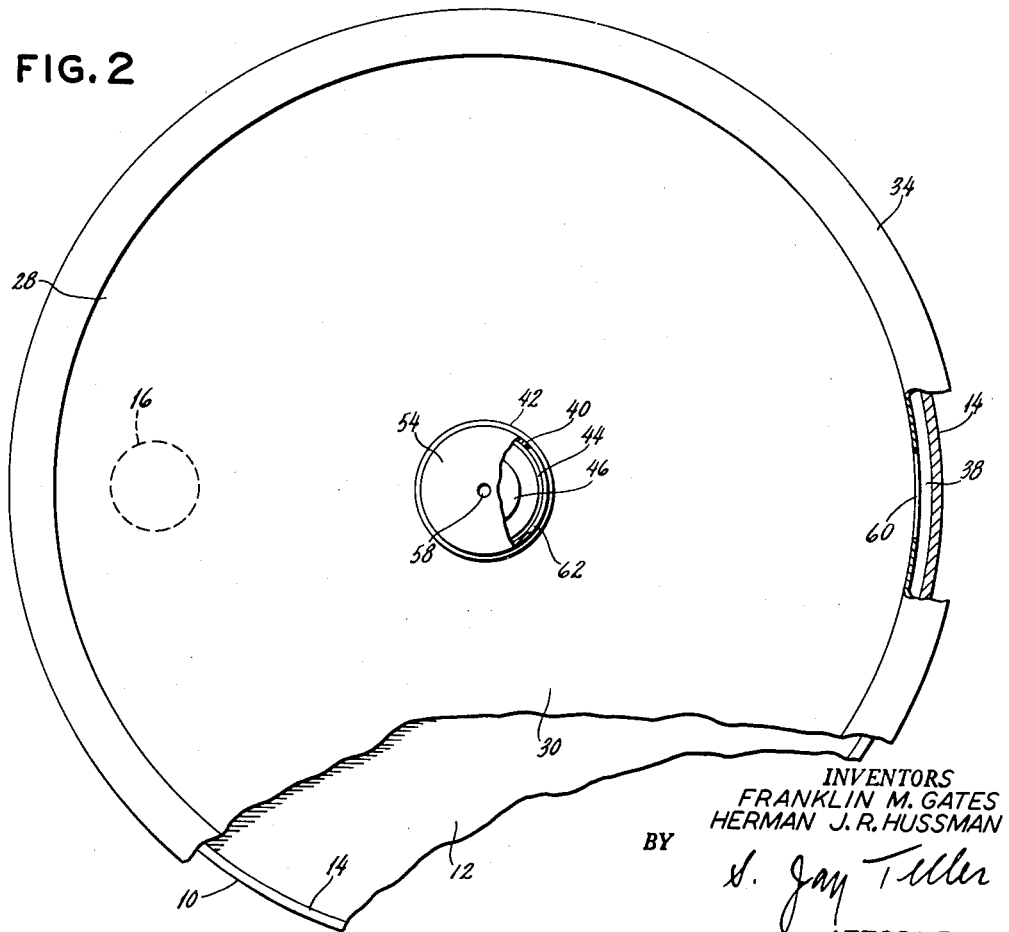
Fig. 2 is a fragmentary plan view with certain portions shown in horizontal section along the line 2—2 of Fig. 1.

Referring to the drawings, particularly to Figs. 1 and 2 thereof, 10 represents a bowl having a bottom wall 12 which is preferably flat and having a peripheral wall 14 which is preferably cylindrical. The bottom wall 12 of the bowl preferably has a drain opening normally closed by a removable stopper 16. A wire mesh or perforated guard 18 is provided below the drain opening.

A centrally located vertical water supply pipe 20 extends into the bowl 10 through a hole in the bottom wall 12 thereof. A watertight joint is provided between the pipe 20 and the bottom wall 12. As shown, the pipe has a shoulder that engages the said bottom wall and the pipe is threaded at 22 below the shoulder. A nut 24 engages the threaded portion 22 of the pipe and a gasket 26 is interposed between the nut and the wall. When the nut 24 is tightened it firmly connects the pipe and the bottom wall, the gasket 26 insuring a watertight connection. The threaded pipe portion 22 below the nut serves to connect the pipe 20 with another suitable water supply which is not shown.

A shell 28 is provided within the bowl 10, the shell having a bottom wall 30 which is preferably flat and having a peripheral wall 32 which is preferably cylindrical. Preferably, but not necessarily, the peripheral wall 32 is extended upwardly above the peripheral wall 14 of the bowl and has an outwardly curved portion 34 which projects over the top edge of the said peripheral wall 14. A space 36 is provided between the bottom walls 12 and 30 and an annular space 38 is provided between the peripheral walls 14 and 32. The diameters of the walls 14 and 32 are such that the annular space 38 is relatively narrow.

The bottom wall 30 of the shell is apertured to receive the pipe 20. A centrally located vertical tube 40 is provided within the shell 28 and around the said pipe 20, this tube having a watertight connection with the bottom wall 30. As shown, the bottom wall 30 is provided with an upstanding integral annular flange 42 and the tube 40 is brazed or soldered to the said flange. An annular space or channel 44 is provided within the tube 40 and around the pipe 20, the tube and pipe diameters being such that the said annular space is very narrow and considerably narrower than the annular space 38.

A nozzle 46 is connected with the upper portion of the pipe 20 and is located within the tube 40. The outer diameter of the nozzle is approximately the same as the outer diameter of the pipe. As shown, the nozzle has a threaded connection with the pipe 20 and a gasket 48 is provided for insuring a watertight connection. A strainer 50 is preferably provided within the pipe and at the bottom of the nozzle. The upper portion of the nozzle 46 has a reduced diameter and a horizontal face 51 extends from the said reduced diameter portion to the periphery. The said upper portion of the nozzle has a conical upper face and the said portion has a central vertical water discharge orifice 52. The upper end of the tube 40 is closed by a metallic disc 54 which is connected by soldering or otherwise. Fitted within the tube 40 and immediately below the disc 54 is a closure 56 which is engageable with the nozzle 46 to constitute a valve seat. The closure 56 is formed of rubber or of other suitable material. The metallic disc 54 has a central hole 58 through which a tool can be inserted for the removal of the closure 56 when it becomes worn or is otherwise deteriorated.

For a purpose to be explained, provision is made near the top of the peripheral wall of the shell for the flow of water under certain conditions from the annular peripheral space 38 of the bowl inwardly into the upper portion of the shell. When the peripheral wall 32 of the shell extends upwardly above the peripheral wall 14 of the bowl, a plurality of slots 60, 60 is provided in the said shell wall 32 near the top thereof and below the level of the top of the wall 14. The number of slots may be varied, but as shown there are two opposite slots. The tube 40 is provided with at least one slot for the flow of water under certain conditions from the said tube outwardly into the interior of the shell. Preferably the tube has a plurality of such slots at about the same level as the slots 60, 60. The number of slots 62, 62 in the tube may be varied, but as shown there are two opposite slots.

When there is little or no water in the bowl 10, the shell 28 is supported on the nozzle 46 by means of the valve seat or closure 56 as shown in Fig. 1. The shell 28 is freely movable upwardly from the position shown and it is adapted to float when there is sufficient water in the bowl 10. Water under relatively low pressure is supplied to the pipe 20, but when the closure 56 engages the nozzle it prevents the discharge of water through the discharge orifice 52. When the shell 28 is raised, either manually or by flotation, the closure 56 is upwardly separated from the nozzle 46 and water is discharged through the orifice 52 and into the tube 40. Some of the water so discharged flows outwardly through the slots 62, 62 and into the shell 28 and some of the water so discharged flows downwardly through the annular channel 44 and into the bowl 10. The size of the annular channel 44 is such that, during normal operation as hereinafter described, only a very small portion of the water flows into the bowl, the major portion of the water flowing into the shell.

The horizontal area of the surface of the water in the annular space 38 has a predetermined ratio to the horizontal area of the surface of the water in the interior of the shell 28. This ratio may be on the order of 1 to 20. The size of the annular channel 44 is preferably such that, during normal operation, the rate of flow through the said channel 44 has a ratio to the rate of flow through the slots 62, 62 which is approximately equal to the said ratio between the area of the annular space 38 and the area of the interior of the shell.

There may be wide variation in the actual dimensions of the various parts of a drinking fountain embodying the invention and also in the relationships of the several dimensions. However, one satisfactory relationship of dimensions is disclosed in Figs. 1 and 2, but the said figures are drawn to a somewhat enlarged scale. In the example given, the internal diameter of the wall 14 of the bowl may be 5.500"; the external diameter of the wall 32 of the shell may be 5.3125"; and the internal diameter of the wall 32 may be 5.2785". When the outer dimensions of the bowl and shell are as stated, the dimension from the bottom of the tube 40 to the bottoms of the slots 62, 62 is 1.3135", and each of the said slots has a height of .125" and a width of .500". The internal diameter of the tube 40 is .700". The external diameter of the pipe 20 is .675" and the lower portion of the nozzle 46 up to the face 51 has the same diameter as the pipe. The several vertical dimensions are such that the said nozzle face 51 is at approximately the same level as the tops of the slots 62, 62 when the shell is supported upon the nozzle as shown. When the parts have the dimensions set forth, the ratio between the rate of flow through the channel 44 and through the slots 62, 62 is as before stated.

The manner of operation of the drinking fountain will be more fully understood by reference to Fig. 1 and to the schematic Figs. 3 to 10.

With no water in the shell or in the bowl, the shell is positioned as shown in Fig. 1 and is supported on the nozzle 46. The closure 56 closes the orifice 52 so that no water can flow. To start the action, the shell is manually raised substantially and to a position such as that shown in Fig. 3. This permits a jet of water to be discharged upwardly from the orifice 52. By reason of the relatively high elevation of the closure 56, most of the water is deflected downwardly from the said closure so that much less than the normal proportion flows through the slots 62, 62 and into the shell 28. A relatively large portion of the water flows through the annular channel 44 and into the bowl 10. The shell is held in the Fig. 3 position until the level of the water in the bowl is approximately at $a$, there being then sufficient water in the bowl for causing the shell to float.

Figure 3:
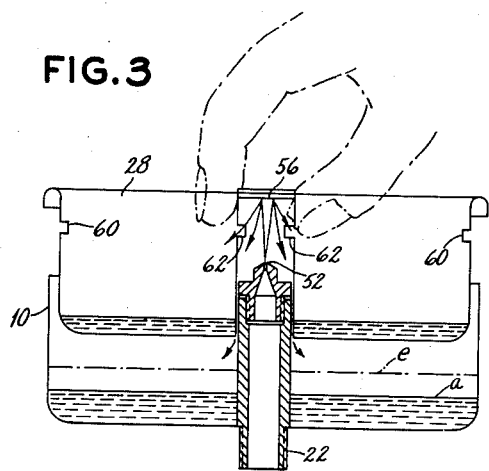
Figs. 3 to 10 are schematic vertical sectional views that illustrate the manner of operation.
Figure 4:
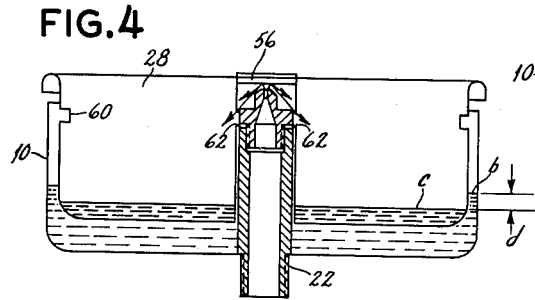
Figure 5:
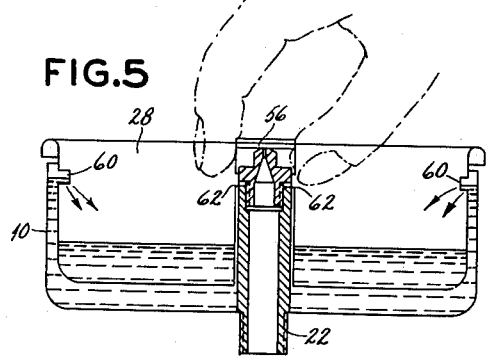

When the water in the bowl has reached the level $a$, the shell is slowly lowered to the position shown in Fig. 4. The lowering of the shell forces some of the water in the bowl upwardly into the annular space 38 and to the level $b$. The water in the shell is at the level $c$, the difference $d$ between the levels $b$ and $c$ being that required for the flotation of the shell. The shell is floated at a level such that the valve seat is separated from the nozzle so that water can flow through the orifice 52. With the closure 56 close to the nozzle, instead of widely spaced therefrom as shown in Fig. 3, the water discharged through the orifice is for the most part deflected laterally by the upper part of the nozzle. As the result of the said deflection, only a small portion of the water flows downwardly through the annular channel 44 and into the bowl 10. Most of the water flows outwardly through the slots 62, 62 and into the shell 28. As before stated, the ratio of flow through the channel 44 and through the slots 62, 62 is approximately equal to the ratio of the horizontal area of the annular space 38 and the horizontal area of the interior of the shell.

It is not always readily possible to accurately time the holding of the shell in elevated position to provide the optimum water level at $a$. Too much water may be admitted so as to provide a water level such as $e$ considerably above the level $a$. With such a higher water level the shell 28 would float too high for satisfactory operation and flooding might result. Although not always necessary, it may be preferable after manual raising of the shell to manually press it downwardly to the position shown in Fig. 5. When the water in the bowl is at a level such as $e$, the downward movement of the shell causes the water in the bowl to rise in the annular space 38 sufficiently to permit the excess to flow inwardly through the slots 60, 60 and into the shell. The shell should be moved slowly to the Fig. 5 position as a rapid movement might not allow time for the water to flow through the slots 60, 60 and some of the water might overflow at the top of the wall 14 instead of flowing through the slots.

Figure 6:
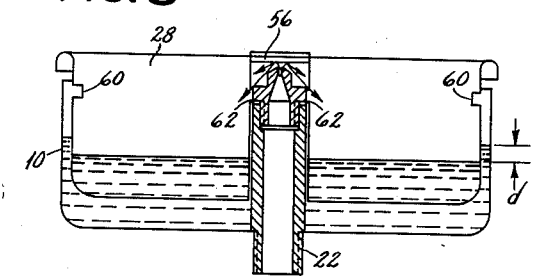

After the excess water in the bowl has flowed through the slots 60, 60 and into the shell, the shell is released and permitted to float as shown in Fig. 6, the shell floating at such a level that water can flow from the orifice 52. The action is then the same as described in connection with Fig. 4. Notwithstanding the much larger amount of water in the shell as shown in Fig. 6, the shell is floated at about the same level as in Fig. 4. Flotation is determined by the difference $d$ in the water levels and not by the amount of water in the shell.

After the water starts to flow into the shell and into the bowl as shown in Fig. 4 or in Fig. 6, the water levels rise substantially equally in the annular space 38 of the bowl and in the shell. Water preferably flows into the bowl and into the shell at the described optimum ratio, but minor variations from the optimum ratio are not important. If the water flows too rapidly into the shell in the Fig. 4 position, the level $c$ tends to rise faster than the level $b$ but the increased flow into the shell causes it to move downwardly. However, only a very small downward movement is possible, as with the assumed proportion of the parts the water level $b$ will rise 20 times as much as the downward movement of the shell and will thus quickly restore the equilibrium wherein the difference in levels is $d$. If the water flows too rapidly into the bowl, the level $b$ tends to rise more rapidly than the level $c$, thus causing the shell to move upwardly. However, only a very small upward movement of the shell is possible, as with the assumed proportion of the parts the water level $b$ will fall 20 times as fast as the upward movement of the shell and will thus quickly restore the equilibrium wherein the difference in levels is $d$. It will therefore be seen that there will be only very minor variations in the level of flotation notwithstanding variations in the relative rates of flow.

Figure 7:
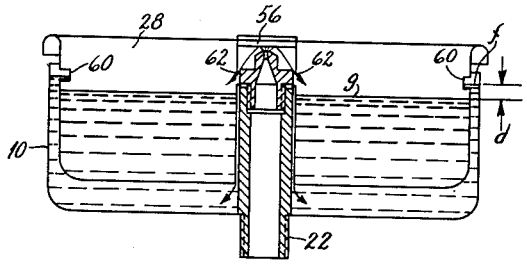
Figure 8:
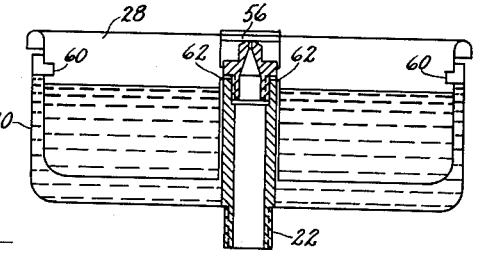

The flow of water into the bowl and into the shell continues from the Fig. 4 position or from the the Fig. 6 position until the water levels in the bowl and in the shell are respectively at $f$ and $g$ as shown in Fig. 7, the said levels having the said difference $d$. As the water level $f$ in the bowl rises slightly above the bottoms of the slots 60, 60, the water flows through the said slots and into the shell. This increases the amount of water in the shell to such an extent that the difference in water levels is less than the difference $d$ required for floatation, and the shell no longer floats. It very quickly sinks to the position shown in Fig. 8, thus pressing the closure 56 against the nozzle 46 so as to shut off the water. If no water is withdrawn from the shell the parts remain in the Fig. 8 position and the water levels remain as therein shown. It will be observed that, with the maximum amount of water in the shell as shown in Fig. 8, the water level in the shell is not above the bottoms of the slots 62, 62 in the tube. Water therefore cannot flow from the shell inwardly through the said slots.

Ordinarily, the poultry are drinking continually or at frequent intervals from the shell 28, thus substantially continually lowering the water level therein. When the water level in the shell is lowered to the extent shown in Fig. 9, the difference in water levels is equal to or larger than $d$ and the shell again tends to float. Assuming continued drinking by the poultry with continued lowering of the water level in the shell, the shell quickly floats and the action is repeated as described in connection with Figs. 4, 6, 7 and 8.

Figure 9:
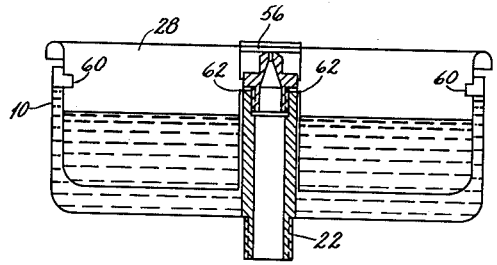
Figure 10:
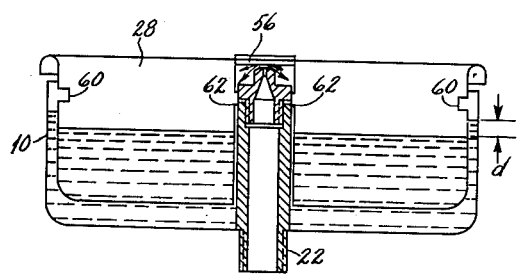

Should it happen that the water level in the shell is lowered to the Fig. 9 position but is not further lowered, the shell can rise only slightly as any slight upward movement of the shell lowers the level of the water in the annular space 38 to a much greater extent. The shell can rise only to a position such as that shown in Fig. 10 wherein the closure 56 is only very slightly separated from the nozzle 46. With no further withdrawal of water from the shell, the closure 56 in the Fig. 10 position permits water to flow to only a limited extent from the orifice 52. The water flows into the bowl and into the shell in about the before-mentioned ratio and the water levels slowly rise about uniformly until they are at $e$ and $f$ as shown in the said Fig. 7. Then the shell again sinks as previously described to the Fig. 8 position.

From the foregoing description of the drinking fountain and of the manner of operation thereof, it will be apparent that the action can be readily started and that with continued drinking by the poultry the flow of water is automatically and quickly started and stopped as required for maintaining a suitable supply.

The inner shell is not positively connected with the bowl and can therefore be easily removed for the cleaning thereof and to provide access to the bowl for the cleaning of the bowl.

The invention claimed is:

1. In a drinking fountain for poultry, the combination of an outer bowl having bottom and peripheral walls, a central vertical water supply pipe extending through and connected with the bottom wall of the bowl, a nozzle at the upper end of the pipe having a central orifice for the upward discharge of water, an inner shell within the bowl having a bottom wall apertured to receive the said pipe and having a peripheral wall spaced inwardly from the peripheral wall of the bowl to provide a narrow annular space surrounding the shell, the said shell being adapted to float in water contained in the bowl and having provision near the top of its peripheral wall for the inward flow of water into the shell from the said annular space, a tube connected with the bottom wall of the shell and surrounding the said pipe and the nozzle which tube has slots therein near the top thereof and communicating with the interior of the shell, the said tube having a diameter such that a narrow annular channel is provided within the tube and around the nozzle and pipe which channel communicates at its lower end with the interior of the bowl, and a closure connected with the tube near the top thereof and engageable with the nozzle to support the shell and to close the nozzle orifice when the shell is in its lowermost position which closure upon upward movement of the shell is separated from the nozzle so as to permit water to be discharged from the nozzle orifice and to flow outwardly through the said tube slots and into the shell and downwardly through the said annular channel and into the bowl, the water flowing into the shell causing it to be partly filled and the water flowing into the bowl causing the partly filled shell to float until water in the said annular space flows inwardly into the bowl near the top thereof so as to cause the shell to sink and thereby engage the closure with the nozzle.

2. A drinking fountain as set forth in claim 1, wherein the size of the annular channel within the tube is such that the ratio between the flow of water through the said channel and the rate of flow of water through the slots in the tube is approximately equal to the ratio between the horizontal area of the surface of the water in the annular space surrounding the shell and the horizontal area of the surface of the water within the shell.

3. A drinking fountain as set forth in claim 1, wherein the peripheral wall of the shell extends substantially above the peripheral wall of the bowl, and wherein the said peripheral wall of the shell is provided with a plurality of slots near the top thereof for the flow of water inwardly from the bowl into the shell.

4. A drinking fountain as set forth in claim 1, wherein the bottom of the said slots in the tube is at a level at least as high as the highest level of water in the shell.

5. A drinking fountain as set forth in claim 1, wherein the shell is free from positive connection with the bowl and is freely removable upwardly therefrom.

References Cited in the file of this patent

UNITED STATES PATENTS

| | | |
|---|---|---|
| 1,160,511 | Imschweiler | Nov. 16, 1915 |
| 2,651,321 | McBride | Sept. 8, 1953 |
| 2,662,503 | Johnson | Dec. 15, 1953 |